United States Patent
Jung

(10) Patent No.: US 9,835,062 B2
(45) Date of Patent: Dec. 5, 2017

(54) VEHICLE COMBUSTION NOISE-MASKING CONTROL APPARATUS AND METHOD USING THE SAME

(71) Applicant: HYUNDAI MOTOR COMPANY, Seoul (KR)

(72) Inventor: In Soo Jung, Suwon-Si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 15/166,660

(22) Filed: May 27, 2016

(65) Prior Publication Data

US 2017/0130625 A1    May 11, 2017

(30) Foreign Application Priority Data

Nov. 6, 2015    (KR) .................. 10-2015-0155930

(51) Int. Cl.
*F01N 1/06* (2006.01)
*G10K 11/00* (2006.01)
*G10K 11/175* (2006.01)

(52) U.S. Cl.
CPC .......... *F01N 1/065* (2013.01); *G10K 11/002* (2013.01); *G10K 11/175* (2013.01); *G10K 2210/1282* (2013.01)

(58) Field of Classification Search
CPC .... F01N 1/065; G10K 11/002; G10K 11/175; G10K 2210/1282
USPC .................................... 381/73.1, 86
See application file for complete search history.

(56) References Cited

U.S. PATENT DOCUMENTS

2015/0043744 A1* 2/2015 Lagodzinski .......... H04R 3/002
                                                        381/73.1

FOREIGN PATENT DOCUMENTS

| JP | H05-071578 A | 3/1993 |
| JP | H08-261277 A | 10/1996 |
| JP | 3502594 B2 | 3/2004 |
| JP | 5554295 B2 | 7/2014 |
| KR | 10-2003-0018943 A | 3/2003 |
| KR | 2003-0050260 A | 6/2003 |
| KR | 10-2011-0062412 A | 6/2011 |

* cited by examiner

*Primary Examiner* — Vivian Chin
*Assistant Examiner* — Douglas Suthers
(74) *Attorney, Agent, or Firm* — McDermott Will & Emery LLP

(57) ABSTRACT

A vehicle combustion noise-masking control method includes: receiving driving information of a vehicle; estimating a frequency of a combustion noise generated in the vehicle using the driving information; and outputting a masking sound when the frequency is equal to or larger than a predetermined frequency.

15 Claims, 5 Drawing Sheets

VEHICLE COMBUSTION NOISE-MASKING CONTROL APPARATUS AND METHOD USING THE SAME

CROSS-REFERENCE TO RELATED APPLICATION

This application claims the benefit of priority to Korean Patent Application No. 10-2015-0155930, filed in the Korean Intellectual Property Office on Nov. 6, 2015, the entirety of which is incorporated herein by reference.

TECHNICAL FIELD

The present disclosure relates to a vehicle combustion noise-masking control apparatus and method using the same.

BACKGROUND

Generally, when a vehicle is driven, combustion noise is generated in an engine compartment of the vehicle and may flow into the interior of the vehicle. Such combustion noise may be generated and propagate into the interior of the vehicle at various magnitudes depending on such factors as the opening angles of engine valves associated with an engine rotation speed, the position of the accelerator pedal, the number of passengers, and various temperature conditions of the interior of the vehicle.

The combustion noise may be generated as a low frequency combustion noise or a high frequency combustion noise depending on the driving condition of the vehicle. Low frequency combustion noise may be reduced by calculating a phase of the low frequency combustion noise and then outputting a reverse-phase sound through a speaker installed in the interior of the vehicle.

However, it is difficult to effectively reduce high frequency combustion noise generated in the engine compartment of the vehicle. As a result, while a vehicle is being driven, a driver may feel a sense of fatigue due to the high frequency combustion noise.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a vehicle combustion noise-masking control apparatus and method that effectively reduce a high frequency combustion noise generated in a vehicle.

An exemplary embodiment in the present disclosure provides a vehicle combustion noise-masking control method, the method including steps of: receiving driving information of a vehicle; estimating a frequency of a combustion noise generated in the vehicle using the driving information; and outputting a masking sound when the frequency is equal to or larger than a predetermined frequency. The driving information may include at least one selected from the group consisting of a vehicle speed, an engine RPM, a position of an accelerator pedal, and a gear ratio.

The step of estimating the frequency of the combustion noise may include determining whether the driving information generates the combustion noise having more than the predetermined frequency.

The step of outputting a masking sound may include setting a frequency band of the masking sound using at least one of the vehicle speed and the position of the accelerator pedal.

The frequency band may include a frequency band of the combustion noise.

The step of outputting a masking sound may output the masking sound using a sound generator disposed inside the vehicle.

The sound generator may include a vibration exciter which amplifies a magnitude of the masking sound.

The sound generator may generate a masking sound that has a frequency of 1000 to 4000 Hz.

According to another exemplary embodiment in the present disclosure, a vehicle combustion noise-masking control apparatus includes: a receiving unit configured to receive driving information of a vehicle; a sound generator disposed inside the vehicle and configured to output a sound; and a controller configured to estimate a combustion noise generated in the vehicle by using the driving information, set a frequency band of the masking sound, and control output of the masking sound of the frequency band.

The sound generator may include at least one vibration exciter which amplifies the sound.

The controller may include a combustion noise estimation unit configured to estimate a frequency band of the combustion noise according to the driving information, and a masking sound setting unit configured to set a frequency band of the masking sound reducing the combustion noise.

The masking sound setting unit may detect a frequency band of the masking sound set according to a vehicle speed.

The frequency band may include the frequency band of the combustion noise.

The frequency band of the combustion noise or the frequency band the masking sound may have a frequency of 1000 to 4000 Hz.

By determining whether the driving information generates the high frequency combustion noise, and outputting the masking sound of the predetermined frequency band according to the vehicle speed and the position of the accelerator pedal, it is possible to reduce the high frequency combustion noise and improve vehicle-driving satisfaction as well as fuel consumption.

DETAILED DESCRIPTION OF THE EMBODIMENTS

Figure 1:
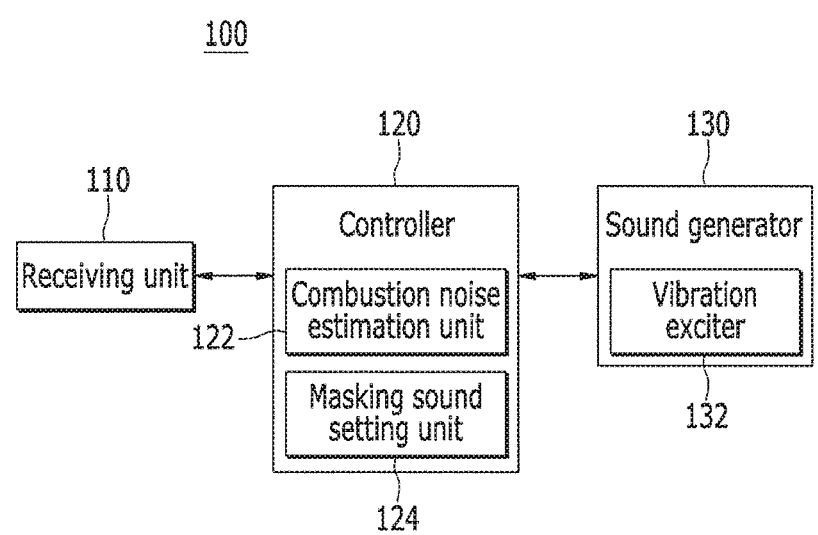
FIG. 1 is a schematic diagram of a vehicle combustion noise-masking control apparatus according to an exemplary embodiment in the present disclosure.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Throughout the specification, unless explicitly described to the contrary, the word "comprise" and variations such as "comprises" or "comprising" will be understood to imply the inclusion of stated elements but not the exclusion of any other elements.

Parts indicated by like reference numerals are the same components throughout the specification.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g., fuel derived from resources other than petroleum).

In addition, some methods may be executed by at least one controller. The term "controller" refers to a hardware device including a memory and a processor configured to execute one or more steps interpreted as an algorithm structure. The memory stores algorithm steps, and the processor specifically executes the algorithm steps to perform one or more processes to be described below.

Further, control logic of the present invention may be implemented by a non-transient computer-readable medium on a computer-readable means including executable program instructions executed by a processor, a controller, or the like. Examples of a computer-readable medium, although not restrictive, include ROMs, RAMs, CD-ROMs, magnetic tapes, floppy disks, flash drives, smart cards, and optical data storages. The computer-readable recording medium may be distributed in a network-connected computer system, and for example, may be stored and executed in a distributed manner by a telematics server or Controller Area Network (CAN).

A vehicle combustion noise-masking control apparatus and method using the same will now be described with reference to FIG. 1 to FIG. 5.

FIG. 1 is a schematic diagram of a vehicle combustion noise-masking control apparatus according to an exemplary embodiment in the present disclosure. In this case, for convenience of explanation, a configuration of the vehicle combustion noise-masking control apparatus according to the exemplary embodiment is schematically illustrated, but the present disclosure is not limited thereto.

Referring to FIG. 1, the vehicle combustion noise-masking control apparatus 100 according to an exemplary embodiment includes a receiving unit 110, a controller 120, and a sound generator 130.

The receiving unit 110 receives driving information of a vehicle, and provides the driving information to the controller 120. Herein, as an example, the driving information of the vehicle includes a vehicle speed, an engine RPM, a position of an accelerator pedal, and a gear ratio.

The controller 120 sets a frequency band of the masking sound reducing the combustion noise generated in the vehicle by using the driving information of the receiving unit 110, and controls the sound generator 130 to output the masking sound of the frequency band.

The controller 120 determines whether the driving information generates a high frequency combustion noise having more than the predetermined frequency. When the driving information generates the high frequency combustion noise, the controller 120 determines the frequency band of the masking sound to reduce the high frequency combustion noise.

In this case, the controller 120 may estimate the frequency band of the combustion noise according to the driving information, and may set the frequency band of the masking sound for reducing the combustion noise.

The controller 120 includes a combustion noise estimation unit 122 and a masking sound setting unit 124 according to an exemplary embodiment.

The combustion noise estimation unit 122 estimates the combustion noise generated by the vehicle using the driving information provided from the receiving unit 110 while the vehicle is running. The combustion noise estimation unit 122 estimates a magnitude of the frequency of the high frequency combustion noise.

The masking sound setting unit 124 sets the frequency band of the masking sound reducing the high frequency combustion noise by using the vehicle speed or the position of the accelerator pedal. In this case, the frequency band of the masking sound may include the frequency band of the high frequency combustion noise. Herein, the position of the accelerator pedal may be divided into HTI (Heavy Tip In), MTI (Middle Tip In), and LTI (Light Tip In) positions.

For such an object, the controller 120 may be implemented with at least one processor operating by a predetermined program, and the predetermined program may be programmed to perform each step according to the vehicle combustion noise-masking control method.

The sound generator 130 disposed in the vehicle generates the masking sound, and outputs the masking sound into the vehicle. The sound generator 130 outputs the masking sound having a frequency within the range of 1000 to 4000 Hz.

The sound generator 130 may be implemented by a resonator that outputs a signal of a specific frequency. The sound generator 130 may be disposed at an internal space of an engine compartment of the vehicle, or directly in the engine. Also, the sound generator 130 may be disposed on an upper cover of the engine or at a cylinder block.

The sound generator 130 includes at least one vibration exciter 132 which amplifies the masking sound according to the exemplary embodiment. The vibration exciter 132 may cooperate with the driving information of the vehicle speed, the engine RPM, and the position of the accelerator pedal.

Figure 2:
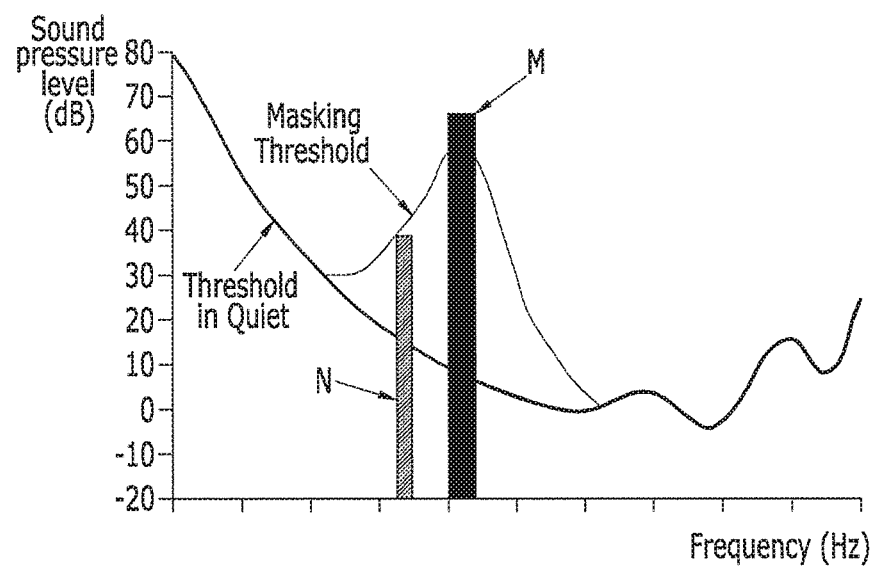
FIG. 2 is a graph showing a frequency band of a combustion noise and a frequency band of a masking sound according to the exemplary embodiment.

FIG. 2 is a graph showing a frequency band of a combustion noise and a frequency band of a masking sound according to the exemplary embodiment.

Referring to FIG. 2, the vehicle combustion noise masking control apparatus 100 according to the exemplary embodiment generates a masking sound (M) to mask a high frequency combustion noise (N) generated in the engine compartment. A frequency band of the masking sound (M) is greater than a frequency band of the high frequency combustion noise (N), or includes the frequency band of the high frequency combustion noise (N). The frequency band of the high frequency combustion noise (N) and the masking sound (M) may range from 1000 to 4000 Hz.

Figure 3:
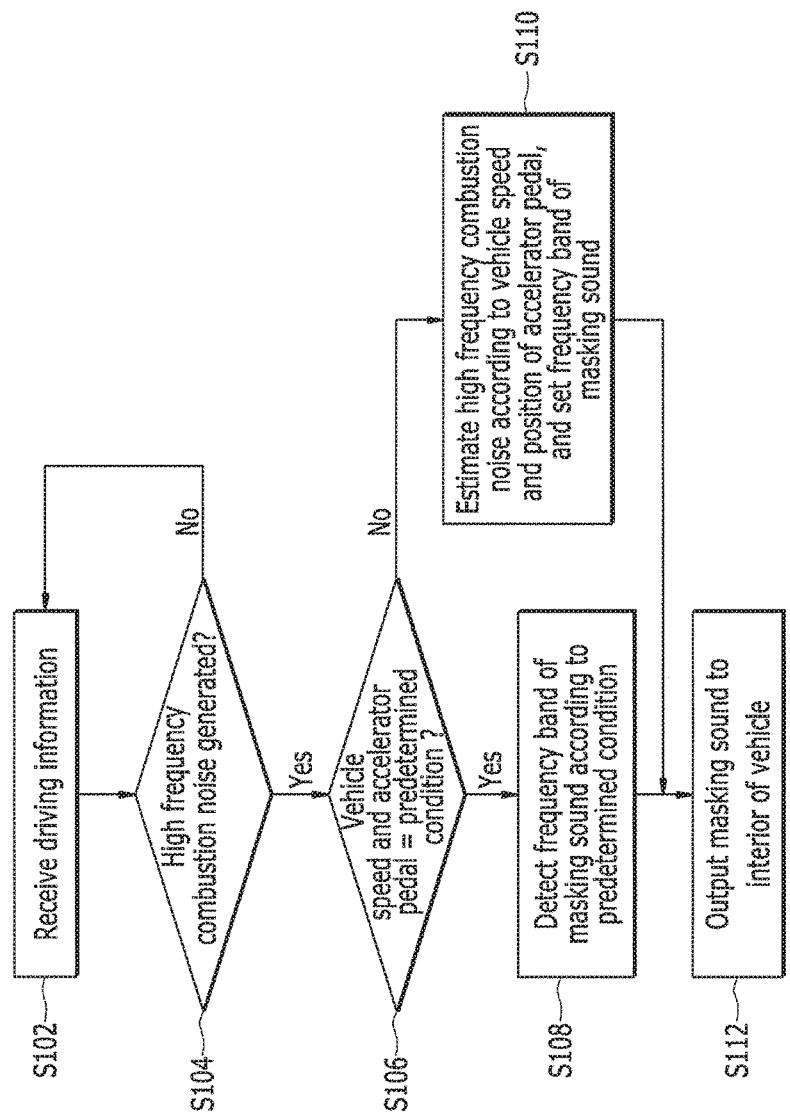
FIG. 3 is a flowchart briefly showing a process for controlling combustion noise masking according to the exemplary embodiment.

FIG. 3 is a flowchart illustrating a process for controlling combustion noise masking according to the exemplary embodiment. The flowchart will be described with the same reference numerals as those of the configurations of FIG. 1 and FIG. 2.

Referring to FIG. 3, the vehicle combustion noise masking control apparatus 100 according to the exemplary embodiment receives driving information of the vehicle, and determines whether the high frequency combustion noise is generated using the driving information at steps S102 and S104. Herein, the driving information of the vehicle includes the vehicle speed, the engine RPM, the position of the accelerator pedal, and the gear ratio.

If the high frequency combustion noise is generated, the vehicle combustion noise masking control apparatus 100 determines whether the vehicle speed and the position of the accelerator pedal satisfy a predetermined condition at step S106. Herein, the position of the accelerator pedal may be divided into the HTI (Heavy Tip In), MTI (Middle Tip In), and LTI (Light Tip In) positions.

The predetermined condition may include: i) when the vehicle speed is lower than 20 kph and the accelerator pedal is in the LTI position, ii) when the vehicle speed is within the range of 20 to 40 kph and the accelerator is in the LTI position, iii) when the vehicle speed is within the range of 20 to 40 kph and the accelerator is in the MTI position, iv) when the vehicle speed is lower than 60 kph and the accelerator is in the LTI position, and v) when the vehicle speed is lower than 60 kph and the accelerator is in the MTI position.

In addition, the predetermined condition may further include i) when the engine is in an idle state and ii) when the vehicle speed is lower than 40 kph and the accelerator pedal is in the LTI position.

Figure 4:
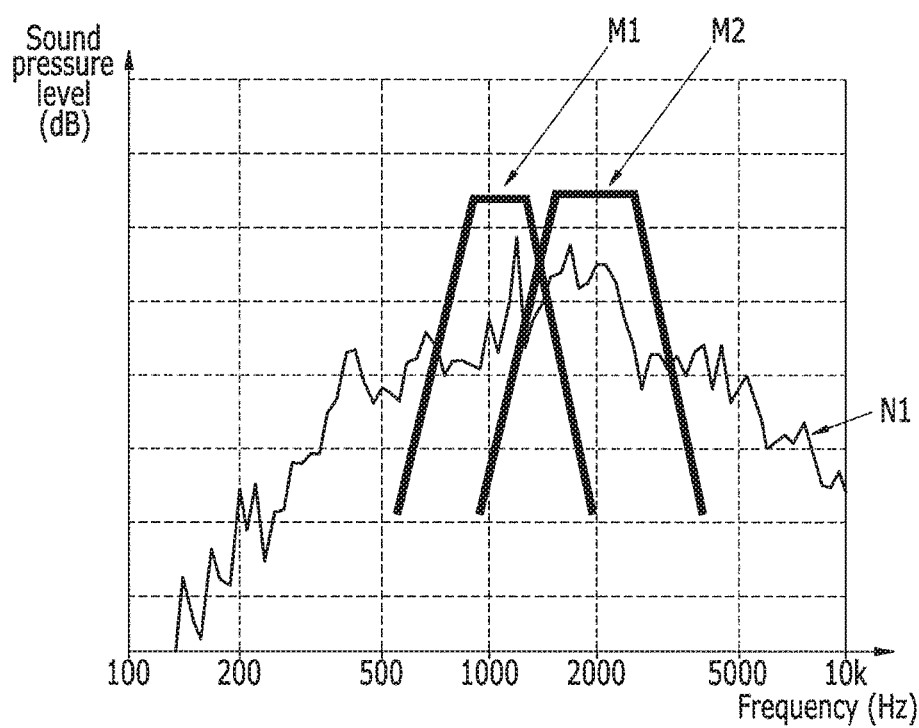
FIG. 4 is a graph showing a masking sound reducing a combustion noise in an engine idle state according to the exemplary embodiment.
Figure 5:
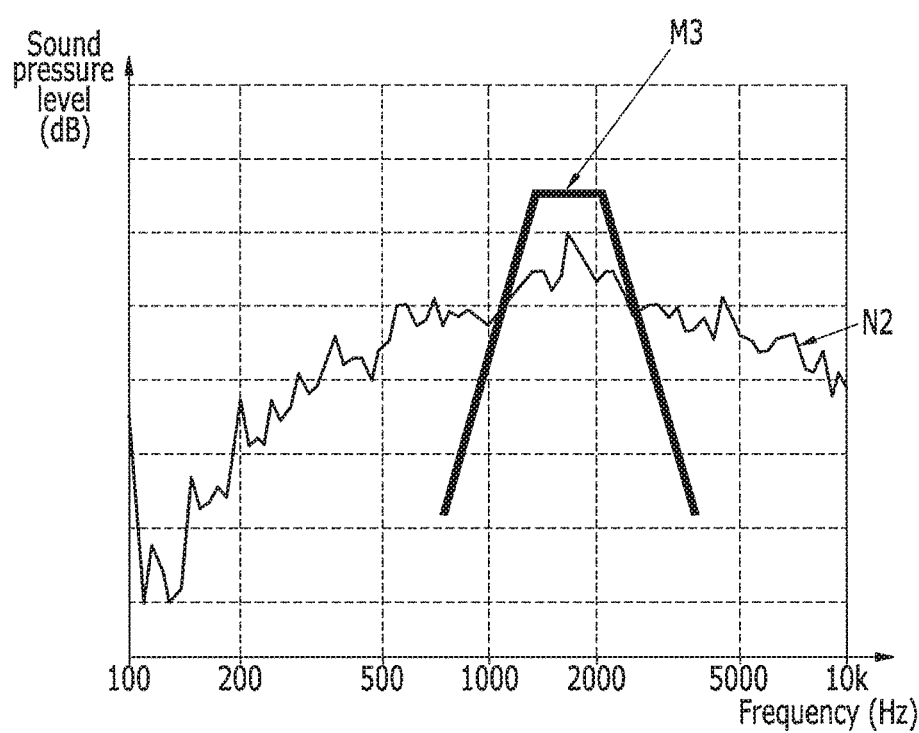
FIG. 5 is a graph showing a masking sound reducing a combustion noise when a vehicle speed is less than 40 kph and an accelerator pedal is in an LTI state according to the exemplary embodiment.

FIG. 4 is a graph showing a masking sound reducing a combustion noise in an engine idle state according to the exemplary embodiment, and FIG. 5 is a graph showing a masking sound reducing a combustion noise when a vehicle speed is less than 40 kph and an accelerator pedal is in an LTI position.

The high frequency combustion noise of the diesel engine is generated relatively more i) when the engine is in the idle state, and ii) when the vehicle speed is lower than 40 kph and the accelerator pedal is in the LTI position.

According to the exemplary embodiment, the vehicle combustion noise masking control apparatus 100 according to the exemplary embodiment generates the masking sound M1 and M2 within the range of 800 to 2500 Hz to mask the high frequency combustion noise N1 within the range of 1000 to 2100 Hz, as shown in FIG. 4.

Further, the vehicle combustion noise masking control apparatus 100 may generate the masking sound M3 within the range of 1200 to 2200 Hz to mask the high frequency combustion noise N2 when the vehicle speed is lower than 40 kph and the accelerator pedal is in the LTI position, as shown in FIG. 5.

Since the high frequency combustion noise depends on a noise characteristic of the engine, the frequency band and sound pressure level of the masking sound may be variously changed according thereto.

The vehicle combustion noise masking control apparatus 100 according to the exemplary embodiment detects the frequency band and the sound pressure level according to the predetermined condition when the vehicle speed and the position of the accelerator pedal correspond to the predetermined condition at step S108.

When the vehicle speed and the position of the accelerator pedal do not correspond to the predetermined condition, the vehicle combustion noise masking control apparatus 100 estimates the high frequency combustion noise according to the vehicle speed and the position of the accelerator pedal, and sets the frequency band of the masking sound to reduce the high frequency combustion noise at step S110.

The vehicle combustion noise masking control apparatus 100 according to the exemplary embodiment outputs the masking sound into the interior of the vehicle to reduce the high frequency combustion noise at step S112.

As described, the vehicle combustion noise masking control apparatus and method according to an exemplary embodiment in the present disclosure determines whether the driving information generates the high frequency combustion noise, and outputs the masking sound of the predetermined frequency band according to the vehicle speed and the position of the accelerator pedal. Therefore, it is possible to reduce the high frequency combustion noise and improve vehicle-driving satisfaction and fuel consumption.

The foregoing exemplary embodiments of the present invention are not implemented only by an apparatus and a method, and therefore may be realized by programs realizing functions corresponding to the configuration of the exemplary embodiment of the present invention or recording media on which the programs are recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A vehicle combustion noise-masking control method, the method comprising the steps of:
   receiving driving information of a vehicle;
   estimating a frequency band of a combustion noise generated in the vehicle using the driving information; and
   outputting a masking sound when the frequency band of the combustion noise is equal to or larger than a predetermined frequency band,
   wherein the driving information includes at least one of a vehicle speed, an engine revolutions per minute (RPM), a position of an accelerator pedal, and a gear ratio,
   wherein the step of outputting the masking sound includes setting a frequency band of the masking sound using the vehicle speed and the position of the accelerator pedal, and
   wherein the frequency band of the masking sound includes the frequency band of the combustion noise.

2. The method of claim 1, wherein
   the step of estimating the frequency of the combustion noise includes determining whether the driving information generates the combustion noise having more than the predetermined frequency.

3. The method of claim 1, wherein
   the step of outputting the masking sound outputs the masking sound using a sound generator disposed inside the vehicle.

4. The method of claim 3, wherein
   the sound generator includes a vibration exciter configured to amplify a magnitude of the masking sound.

5. The method of claim 4, wherein
   the sound generator generates the masking sound that has a frequency within the range of 1000 to 4000 Hz.

6. The method of claim 1, wherein the masking sound reduces the combustion noise.

7. A vehicle combustion noise-masking control apparatus, comprising:
   a sensor configured to receive driving information of a vehicle;
   a sound generator disposed inside the vehicle and configured to output a masking sound; and
   a controller configured to estimate a combustion noise generated in the vehicle using the driving information, set a frequency band of the masking sound, and control output of the masking sound, wherein the driving information includes at least one of a vehicle speed, an engine revolutions per minute (RPM), a position of an accelerator pedal, and a gear ratio, wherein a frequency band of the masking sound is set using the vehicle speed and the position of the accelerator pedal, and wherein the frequency band of the masking sound includes a frequency band of the combustion noise.

8. The device of claim 7, wherein the sound generator includes at least one vibration exciter which amplifies the masking sound.

9. The device of claim 8, wherein the controller includes:

a combustion noise estimation unit configured to estimate the frequency band of the combustion noise according to the driving information; and a masking sound setting unit configured to set the frequency band of the masking sound, wherein the masking sound reduces the combustion noise.

10. The device of claim 9, wherein the masking sound setting unit determines the frequency band of the masking sound in accordance with the vehicle speed.

11. The device of claim 7, wherein the masking sound reduces the combustion noise.

12. The device of claim 10, wherein the frequency band of the masking sound is greater than the frequency band of the combustion noise.

13. The device of claim 10, wherein the frequency band of the combustion noise and the frequency band of the masking sound are within the range of 1000 to 4000 Hz.

14. The device of claim 10, wherein at least one of the frequency band of the combustion noise and the frequency band of the masking sound is within the range of 1000 to 4000 Hz.

15. The device of claim 10, wherein the sensor includes an accelerator pedal position sensor and a vehicle speed sensor.

* * * * *